(12) United States Patent
Kitamura et al.

(10) Patent No.: US 6,916,068 B2
(45) Date of Patent: Jul. 12, 2005

(54) ARMREST APPARATUS

(75) Inventors: Yoshiharu Kitamura, Nagano (JP); Makoto Saito, Nagano (JP); Takashi Ogino, Nagano (JP); Toshiya Migita, Nagano (JP); Yoshihisa Nakagaki, Aichi (JP); Nobuyuki Wakabayashi, Kanagawa (JP)

(73) Assignee: NHK Spring Co. Ltd., Kanagawa (JP)

( * ) Notice: Subject to any disclaimer, the term of this patent is extended or adjusted under 35 U.S.C. 154(b) by 0 days.

(21) Appl. No.: 10/694,904

(22) Filed: Oct. 29, 2003

(65) Prior Publication Data

US 2004/0135419 A1 Jul. 15, 2004

(30) Foreign Application Priority Data

Oct. 29, 2002 (JP) ........................................ P2002-314897

(51) Int. Cl.7 .............................. B60N 2/46; A47C 7/54
(52) U.S. Cl. ............................... 297/411.3; 297/411.38; 297/411.32; 297/115
(58) Field of Search ..................... 297/411.3, 411.32, 297/411.35, 411.38, 115

(56) References Cited

U.S. PATENT DOCUMENTS

| | | | | |
|---|---|---|---|---|
| 6,050,645 A | * | 4/2000 | Bradbury | 297/411.38 |
| 6,209,960 B1 | * | 4/2001 | Bradbury | 297/411.35 |
| 6,467,847 B2 | * | 10/2002 | Bidare | 297/411.32 |
| 6,578,922 B2 | * | 6/2003 | Khedira et al. | 297/411.32 |

FOREIGN PATENT DOCUMENTS

| | | |
|---|---|---|
| JP | 63-28926 | 3/1988 |
| JP | 63-12773 | 12/1988 |

* cited by examiner

*Primary Examiner*—Anthony D. Barfield
(74) *Attorney, Agent, or Firm*—Jan C. Edwards; Dickinson Wright PLLC

(57) ABSTRACT

An armrest apparatus includes a fixed shaft fixed to a seat frame, a rotation plate integrally connected to an armrest body and having a tubular portion into which the fixed shaft is inserted, a lock spring wound tightly on outer peripheral surfaces of a part of the fixed shaft and the tubular portion of the rotation plate in a free condition, a cancellation block rotatably mounted on a pivot shaft, and a cam unit mounted on a distal end of the fixed shaft and including a lock-canceling cam portion and a re-lock cam portion, the re-lock cam portion being spaced from the lock-canceling cam portion in a direction of rotation of the cam member.

10 Claims, 5 Drawing Sheets

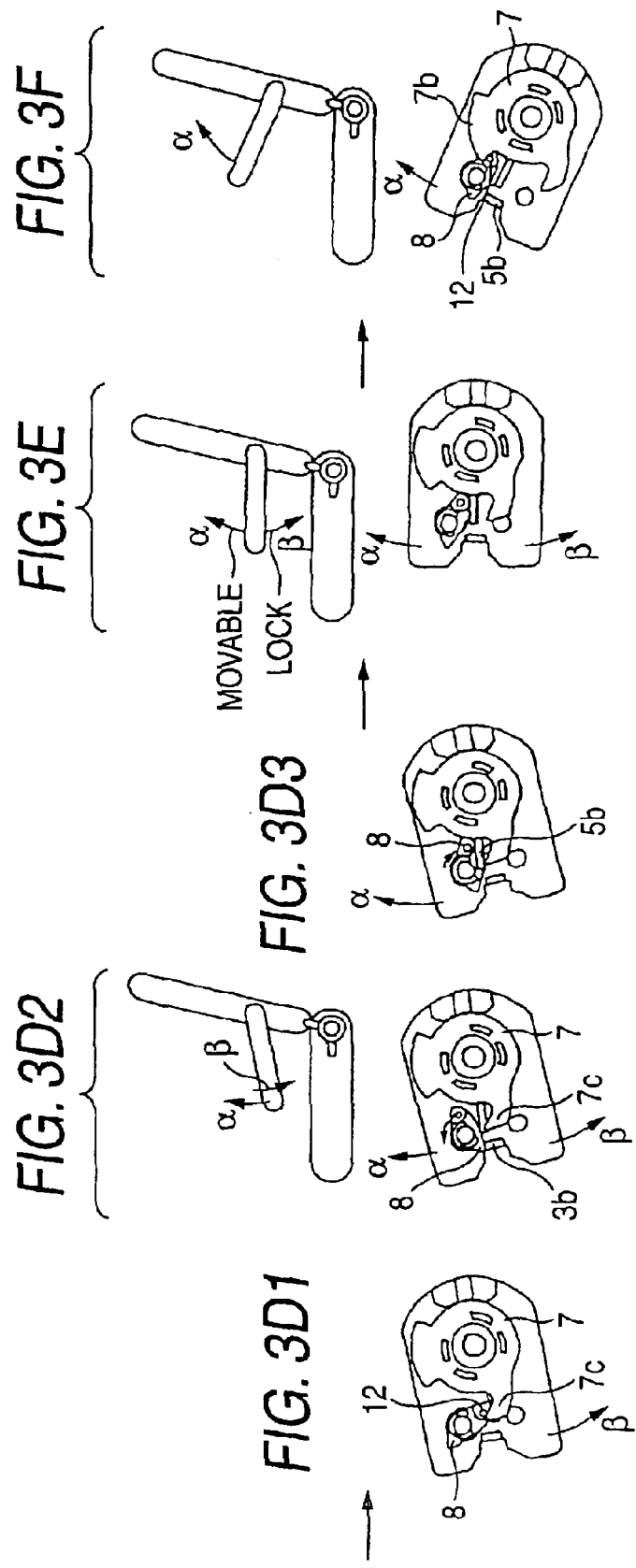

ARMREST APPARATUS

This application claims priority from Japanese Patent Application No. 2002-314897, filed Oct. 29, 2002, the entire contents of which are herein incorporated by reference to the extent allowed by law.

BACKGROUND OF THE INVENTION

1. Field of the Invention

This invention relates to a movable-type armrest apparatus capable of adjusting the angle of an armrest of a seat in a step-less manner.

2. Description of the Related Art

An armrest on a seat of a vehicle or the like, when not in use, is held in a stored position (closed position) immediately adjacent to a backrest so that it will not become a hindrance.

As shown in FIG. 4, one conventional armrest apparatus includes a shaft lock coil spring 120, and an operating mechanism 150 mounted on an armrest body 110 (see, for example, JP-Y-63-12773). This coil spring 120 is wound tightly on outer peripheral surfaces of the fixed shaft (not shown) fixed to a seat frame 100 side and rotation tube(not shown) (which is provided at the armrest body 110, and is rotatably fitted on the fixed shaft). The coil spring 120 is retained at its one end by the armrest body 110, and a direction of tightening (winding) of this coil spring 120 coincides with a direction of pivotal movement of the armrest body 110 in its opening direction. The operating mechanism 150 comprises an operating member 130, and an interlocking member 140 for transmitting the movement of the operating member 130 to the other end of the shaft lock coil spring 120. By operating the operating member 130, the shaft lock coil spring 120 is driven in an unwinding direction.

FIG. 5 shows an important portion of a structure (see, for example, JP-Y-63-28926) which is an improvement over the above armrest of the JP-Y-63-12773. In this improved structure, when an armrest body 210 is located in a stored position, a hook 230, formed at a free end of a shaft lock coil spring 220, is fitted in a recess 250 formed in a swinging member 240, thereby holding the armrest in this position.

The above prior techniques have the following problems.

Because the locking operation as using the armrest and the lock-canceling operation as adjusting the armrest angle are effected by using the interlock member 140, the operation is cumbersome. And besides, there is a possibility that upon inadvertently touching the interlocking member 140, the locking is accidentally cancelled, thus leading to a malfunction.

On the other hand, in the armrest apparatus of the JP-Y-63-28926, in order to solve the problems with the interlocking member of the JP-Y-63-12773 for effecting the locking operation and the lock-canceling operation, the swinging member 240 is used instead of the interlocking member. The locking operation and the lock-canceling operation are effected by this swinging member 240 provided in the vicinity of a lock mechanism portion. In the armrest-stored position of FIG. 5, a stopper (not shown) is usually provided between an armrest mounting portion (not shown) and the armrest body 210 to prevent a further movement (in a clockwise direction in the drawing) of the armrest from the stored position.

However, when a load, such as the weight of the user's body, tending to further move the armrest from the stored position, is applied thereto, there is a possibility that after the free end hook portion 230 of the shaft lock coil spring 220 is fitted in the recess 250 in the swinging member 240, the armrest is slightly pivotally moved in the clockwise direction because of variations in the component parts or others. As a result, the free end hook 230, the recess portion 250 of the swinging member 240, and that portion of an end member 260, disposed in the vicinity of a stopper wall 270, are liable to be deformed. And besides, the parts of the lock mechanism portion, including the free end hook 230, the swinging member 240 and the end member 260, are complicated in shape, and therefore it is difficult to obtain the required precision of these parts, and therefore this is one cause of the increased cost of the production and the assemblage.

SUMMARY OF THE INVENTION

This invention has been made in order to solve the above problems, and an object of the present invention is to provide an armrest apparatus in which by using a simple mechanism, the precision of parts is enhanced, and also the cost is reduced, and besides the deformation of the parts is eliminated, and an operating position of an armrest, as well as the range of its operation, can be arbitrarily set.

The above problems have been solved by an armrest apparatus of the present invention has a fixed shaft fixed to a seat frame; a rotation plate integrally connected to an armrest body and having a tubular portion into which the fixed shaft is inserted, so that the tubular portion is rotatably supported on the fixed shaft; a lock spring wound tightly on outer peripheral surfaces of a part of the fixed shaft and the tubular portion of the rotation plate in a free condition, one end of the lock spring being formed into a fixing-side hook retained by the rotation plate, while the other end thereof being formed into a free-side hook; a cancellation block rotatably mounted on a pivot shaft, the pivot shaft being fixedly mounted on the rotation plate in parallel to the fixed shaft, and is disposed adjacent to the free-side hook; and a cam unit mounted on a distal end of the fixed shaft and including a lock-canceling cam portion and a re-lock cam portion, wherein while the armrest body being pivotally moved in a storing direction, the free-side hook abuts against the lock-canceling cam portion through the cancellation block, and the lock-canceling cam portion expands the lock spring in an unwinding direction to enlarge its diameter to cancel a locked condition of the armrest body, the re-lock cam portion is spaced from the lock-canceling cam portion in a direction of rotation of the cam member, while the armrest body being pivotally moved in an opening direction, the free-side hook abuts against the re-lock cam portion through the cancellation block, and the re-lock cam portion causes the lock spring to spring back in a diameter-reducing direction to lock the armrest body. Wherein, the free condition means that the rotation plate is rotatably connected with the fixed shaft.

The above armrest apparatus further has a spring pin mounted on the cancellation block, wherein while the armrest body is pivotally moved in the storing direction, the spring pin abuts against the lock-canceling cam portion to push up the cancellation block, and the cancellation block has a flat portion for abutting engagement with the lock-canceling cam portion to hold the cancellation block in the pushed-up position, and while the armrest body is pivotally moved in the opening direction, the spring pin abuts against the re-lock cam portion, so that the cancellation block is rotated in a reverse direction to cause the lock spring to spring back in the diameter-reducing direction, thereby holding the armrest body in the locked condition.

The above armrest apparatus, wherein the angle of mounting of the cam member relative to the seat frame about its axis, a peripheral length of the lock-canceling cam portion, and the distance between the lock-canceling cam portion and the re-lock cam portion are determined in accordance with the operating position of the armrest and the range of operation thereof.

The above armrest apparatus, wherein the rotation plate has a stamped-out projected portion which limits the range of rotation of the cancellation block.

The above armrest apparatus, wherein a return spring is fitted on the pivot shaft, is retained at one end thereof by the rotation plate, and at the other end thereof by the cancellation block, and the cancellation block is urged by the return spring in a direction toward or away from the free-side hook.

The above armrest apparatus, wherein a frictional resistance member is provided between the pivot shaft and the cancellation block.

BRIEF DESCRIPTION OF THE DRAWINGS

FIGS. 3A to 3F are views explanatory of an angle-adjusting operation of the armrest apparatus of the present invention;

DETAILED DESCRIPTION OF THE PREFERRED EMBODIMENT

Figure 1:
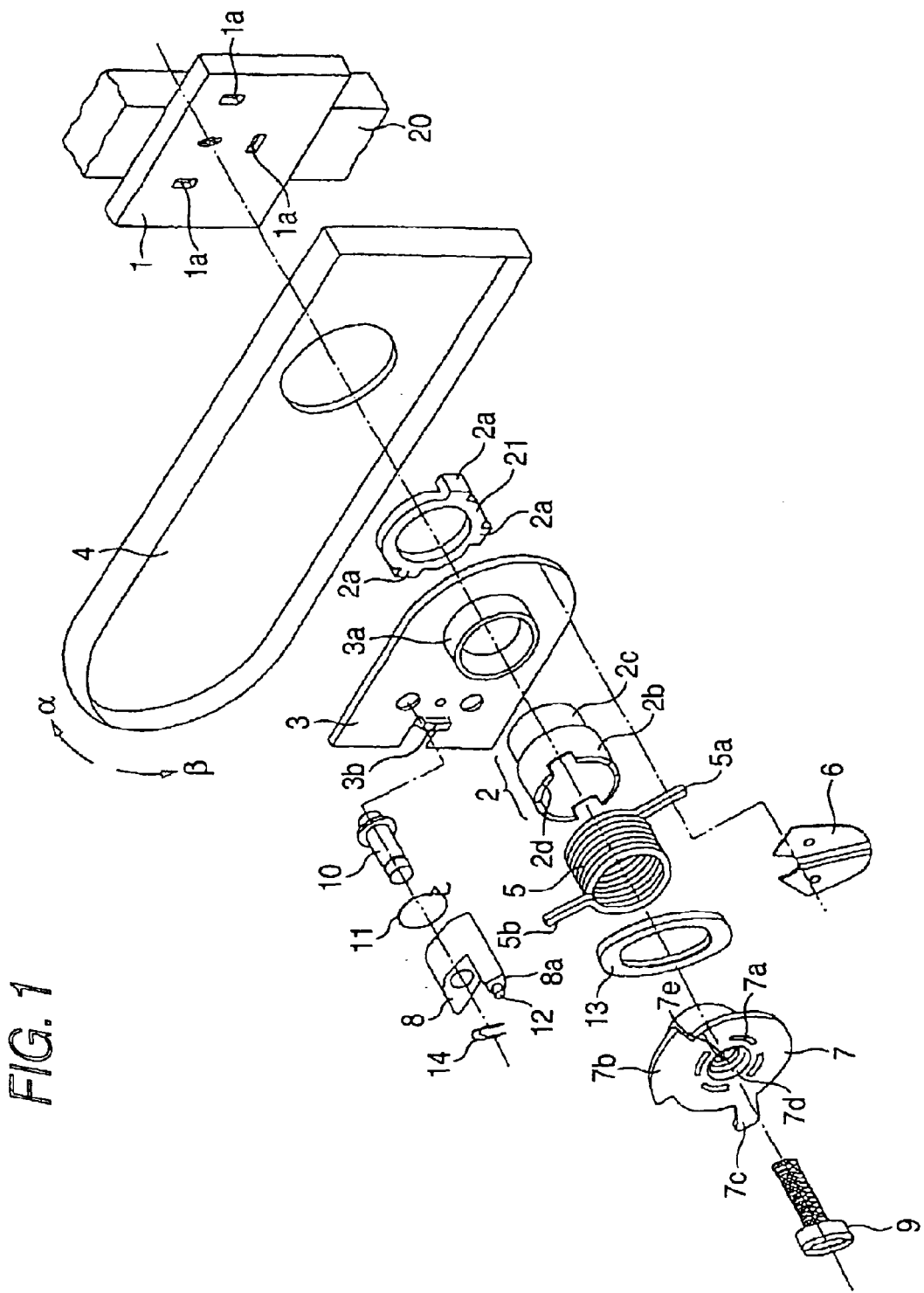
FIG. 1 is an exploded, perspective view of one preferred embodiment of an armrest apparatus of the present invention.
Figure 2A:
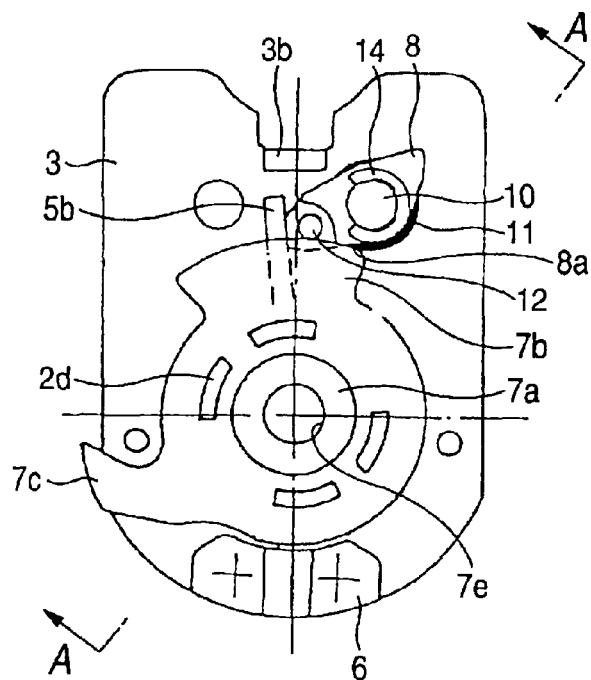
FIG. 2A is a front-elevational view of an important portion of the armrest apparatus of the above embodiment.
Figure 2B:
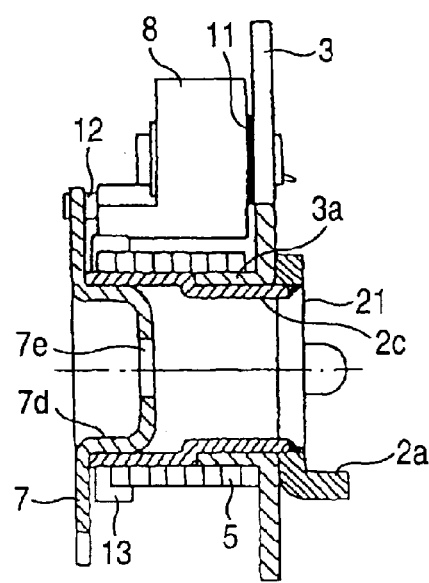
FIG. 2B is a side-elevational view (partly cross-sectional view) of the armrest apparatus of FIG. 2A.

FIG. 1 is an exploded, perspective view of one preferred embodiment of an armrest apparatus of the present invention, FIG. 2A is a front-elevational view of the armrest apparatus in its assembled condition, and FIG. 2B is a side-elevational view (partly cross-sectional view) of the armrest apparatus of FIG. 2A.

The armrest apparatus of this embodiment comprises an armrest body 4, a rotation plate 3, a fixed shaft 2, a lock spring 5, a cam member 7, and a cancellation block 8. The whole of the armrest apparatus is mounted on an armrest mounting portion 1 fixedly secured by welding or the like to a seat frame 20.

The fixed shaft 2 has a stepped configuration, and has a larger-diameter portion 2b and a smaller-diameter portion 2c. A ring member 21 is fixedly secured by welding or the like to a distal end (directed toward the armrest mounting portion 1) of the smaller-diameter portion 2c. Therefore, the whole of the fixed shaft 2 is formed by integrally connecting the ring member 21 thereto.

The rotation plate 3 is fixedly secured to the armrest body 4 by welding or the like, and therefore is integrally connected thereto. In FIG. 1, a direction of arrow α is a direction of closing (storing) of the armrest, while a direction of arrow β is a direction of opening of the armrest. As shown in FIG. 2B, the ring member 21 is welded to the distal end of the smaller-diameter portion 2c, with the rotation plate 3 held between the ring member 21 and the larger-diameter portion 2b. Three claws 2a, projecting toward the armrest mounting portion 1, are formed on the ring member 21, and are circumferentially spaced from one another. These claws 2a are fitted respectively in fitting holes 1a formed respectively in those portions of the armrest mounting portion 1 opposed respectively to the claws 2a, and by doing so, the whole of the fixed shaft 2 is fixedly mounted on the armrest mounting portion 1.

The rotation plate 3 has a tubular portion 3a for the insertion of the smaller-diameter portion 2c of the fixed shaft 2 thereinto. The smaller-diameter portion 2c is thus inserted into the tubular portion 3a, so that the rotation plate 3 is rotatably supported by the smaller-diameter portion 2c. The tubular portion 3a of the rotation plate 3 is substantially equal in outer diameter to the larger-diameter portion 2b of the fixed shaft 2, and the lock spring 5 is wound on outer peripheral surfaces of the tubular portion 3a and larger-diameter portion 2b.

A coil portion of the lock spring 5 has such an inner diameter that the lock spring 5 in its free condition is held tightly with the outer peripheral surface of the larger-diameter portion 2b of the fixed shaft 2 and the outer peripheral surface of the tubular portion 3a of the rotation plate 3. Namely, the coil portion of the lock spring 5 in its free condition has the inner diameter smaller than the outer diameter of the larger-diameter portion 2b of the fixed shaft 2 and the outer diameter of the tubular portion 3a of the rotation plate 3. A fixing-side hook 5a and a free-side hook 5b are formed at opposite ends of the lock spring 5, respectively, and extend radially outwardly from the lock spring 5.

The fixing-side hook 5a is retained by a hook fixing member 6, and the hook fixing member 6 is welded to the rotation plate 3, so that the fixing-side hook 5a is retained by the rotation plate 3. With this retaining construction, the lock spring 5 is rotated together with the rotation plate 3, that is, together with the armrest body 4. The free-side hook 5b, formed at the other end of the lock spring 5, is in a free condition. The lock spring 5 is so wound that the coil portion can be enlarged in diameter when the armrest is in a lock-canceled condition in the stored position (closed position), and that the coil portion can be reduced in diameter when the armrest is in a locked condition in the open position.

The cancellation block 8 is provided in the vicinity of the free-side hook 5b of the lock spring 5. The cancellation block 8 is rotatably mounted on a pivot shaft 10 fixedly mounted on the rotation plate 3 in substantially parallel relation to the fixed shaft 2. This cancellation block 8 is retained by an E-ring 14 against disengagement from the pivot shaft. The pivot shaft 10 is fixedly secured to the rotation plate 3 by press-deforming or the like.

Convex portions 2d, formed at a distal end of the larger-diameter portion 2b of the fixed shaft 2, are fitted respectively in arcuate slots 7a formed in the cam member 7. The cam member 7 is fixedly secured to the distal end portion of the fixed shaft 2 by press-deforming or the like. A lock-canceling cam portion 7b of an arcuate shape for canceling the locking of the lock spring 5 through the cancellation block 8 is formed at an outer peripheral edge of the cam member 7, and a re-lock cam portion 7c of an arcuate shape for re-locking the lock spring 5 through the cancellation block 8 is also formed at the outer peripheral edge of the cam member 7.

By changing a relative angle between the ring member 21 of the fixed shaft 2 and the cam member 7, that is, by changing the angular position of mounting of the ring member 21 relative to the fixed shaft 2, the operating position of the armrest can be arbitrarily set. And besides, by changing the peripheral length of the arcuate lock-canceling cam portion 7b of the cam member 7 and by changing the angular spacing between lock-canceling cam portion 7b and the re-lock cam portion 7c, the range of operation of the armrest can be arbitrarily set.

A tubular portion 7d for fitting into the end portion of the fixed shaft 2 is formed at a central portion of the cam member 7, and a screw hole 7e is formed through the central portion of the cam member 7, and a screw 9 for fixing the cam member 7 and the fixed shaft 2 to the armrest mounting portion 1 is passed through the screw 9. The screw 9 is passed through the cam member 7, and is threaded into a screw hole formed in the armrest mounting portion 1.

The cancellation block 8 is always urged toward the free-side hook 5b by a return spring 11. The return spring 11 serves to prevent an accidental movement (such as vibration) of the cancellation block 8 in the locked condition of the lock spring 5 and also to prevent the production of an abnormal sound due to this accidental movement. The cancellation block may be urged by the return spring in the opposite direction. The use of the return spring 11 can be omitted, and instead grease of high viscosity is applied between the pivot shaft 10 and the cancellation block 8, or a wave spring or a washer is provided therebetween, so as to apply a frictional resistance, and by doing so, a similar effect can be obtained.

A spring pin 12 is press-fitted in that end portion of the cancellation block 8 disposed close to the lock spring 5. For example, for pivotally moving the armrest body 4 in the storing direction (e.g. in a clockwise direction in FIG. 2) when the armrest is in use, that is, located in the open position (generally horizontal position), the spring pin 12 abuts against the lock-canceling cam portion 7b of the cam member 7, and when the armrest body 4 is further pivotally moved in the clockwise direction (the storing direction), the spring pin 12 enlarges the diameter of the lock spring, thereby achieving the lock-canceled condition. The cancellation block 8 has a flat portion 8a formed at a lower surface of the front end portion thereof, and this flat portion 8a maintains the lock-canceled condition, that is, this flat portion 8a supports the free-side hook 5b of the lock spring 5 in the lock-canceled condition.

On the other hand, when the armrest body 4 is pivotally moved in the opening direction, that is, in the counterclockwise direction, the spring pin 12 abuts against the re-lock cam portion 7c, and when the armrest body 4 is further pivotally moved in the opening direction, the spring pin 12 reduces the diameter of the lock spring 5, thereby achieving the locked condition (or the re-locked condition).

Further, the cancellation block 8 abuts against a stamped-out projected portion 3b formed on the rotation plate 3, so that the range of its rotation angle is limited.

A spacer 13 for correcting the posture of the lock spring 5 is interposed between the lock spring 5 and the cam member 7. However, the spacer 13 is not an essential part.

Next, the angle-adjusting operation of the armrest apparatus of the present invention will be described. FIGS. 3A to 3F are views explanatory of the angle-adjusting operation of the armrest apparatus of the present invention.

First, when the armrest body 4, mounted on the seat frame 20 of the seat 102, is located in the armrest-stored (closed) position (FIG. 3A) where the armrest body 4 is held in the uppermost position, the spring pin 12 is pushed up by the lock-canceling cam portion 7b, and the flat portion 8a of the cancellation block 8 for supporting the free-side hook 5b of the lock spring 5 in the lock-canceled condition maintains the lock-canceled condition in which the lock spring 5 is enlarged in diameter in an unwinding direction.

Figure 3C:
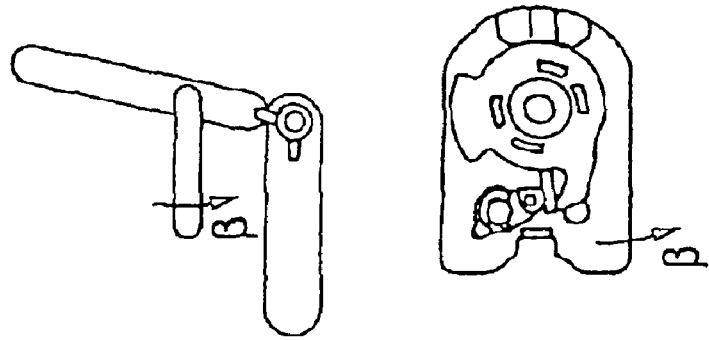
Figure 3B:
Figure 3B:
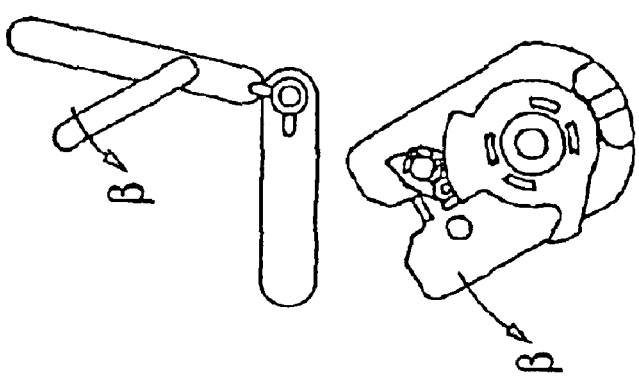

In this condition, the armrest body 4 is pivotally moved in the opening direction (counterclockwise direction b), and when the armrest body 4 is located in a position of FIG. 3B, the spring pin 12 is still pushed up by the lock-canceling cam portion 7b, and the flat portion 8a of the cancellation block 8 for supporting the free-side hook 5b of the lock spring 5 in the lock-canceled condition maintains the lock-canceled condition in which the lock spring 5 is enlarged in diameter in the unwinding direction.

Then, the armrest body 4 is further pivotally moved in the opening direction b, and when the armrest body 4 is located in a position of FIG. 3C, the spring pin 12 is spaced from the lock-canceling cam portion 7b, but the flat portion 8a of the cancellation block 8 still maintains the lock-canceled condition in which the lock spring 5 is enlarged in diameter in the unwinding direction.

In this condition, the armrest body 4 is further pivotally moved in the direction b, and immediately after the spring pin 12 abuts against the re-lock cam portion 7c in a position of FIG. 3D1, the spring pin 12 is pushed by the re-lock cam portion 7c, so that the cancellation block 8 is rotated about its axis in a counterclockwise direction, but this rotation is limited by the stamped-out projected portion 3b of the rotation plate 3 (FIG. 3D2). After all, the cancellation block 8 is held in a position of FIG. 3D3 by the return spring 11 (In this condition, the cancellation block 8 abuts against the free-side hook 5b of the lock spring 5). As a result, the lock spring 5 is sprung back to be reduced in diameter (that is, tightened), so that the arm rest body 4 is locked, that is, held in the locked condition (or the re-locked condition).

After the armrest body 4 is held in the locked condition (or the re-locked condition), the armrest body 4 can be adjusted to a desired angle, and can be used in this condition.

Namely, although the armrest body 4 can be pivotally moved in the clockwise direction (storing direction) a, the armrest body 4 is locked against further pivotal movement in the counterclockwise direction b. A position of FIG. 3E is the opened position of the armrest in use.

In this condition, when the armrest body 4 is further pivotally moved in the direction a, it is brought into a position of FIG. 3F where the spring pin 12 of the cancellation block 8 abuts against the lock-canceling cam portion 7b.

Figure 3A:
Figure 3A:
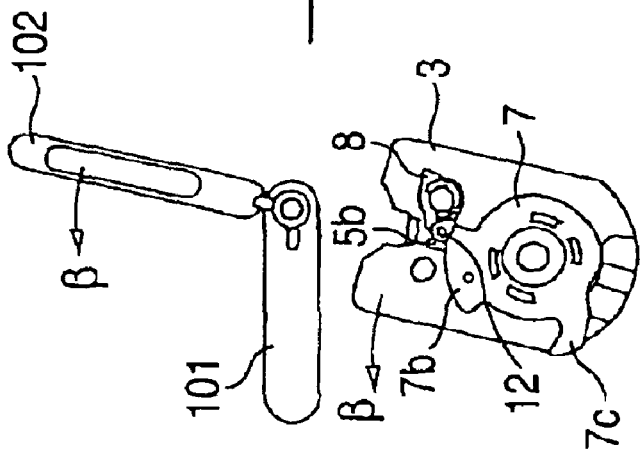
Figure 4:
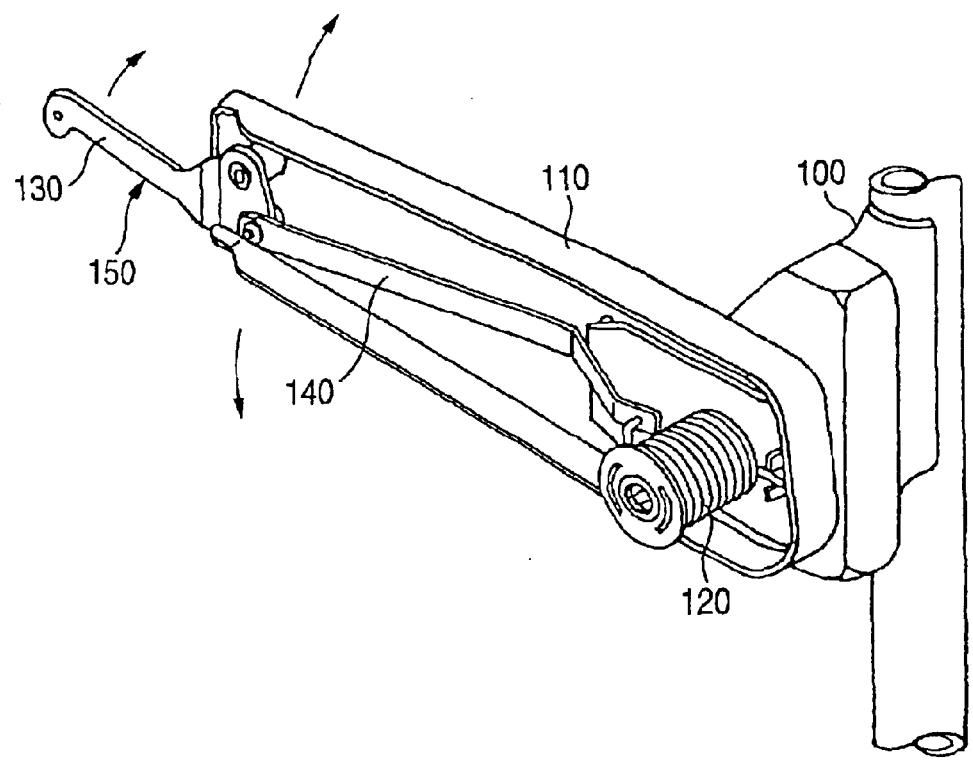
FIG. 4 is a perspective view showing one conventional armrest apparatus.
Figure 5:
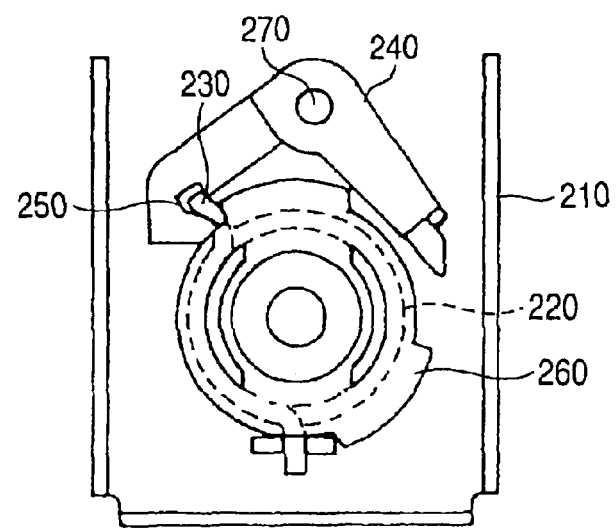
FIG. 5 is a front-elevational view showing an important portion of another conventional armrest apparatus.

In this condition, when the armrest body 4 continues to be further pivotally moved in the direction a, the spring pin 12 is pushed by the end of the lock canceling cam portion 7b, and is rotated about its axis in a clockwise direction, so that the lock pin 12 is pushed up to be disposed on the lock canceling cam portion 7b, and the flat portion 8a of the cancellation block 8 expands the lock spring 5 in the unwinding direction to enlarge its diameter, and maintains the lock-canceled condition. Namely, the lock-canceled condition as in the armrest-stored position of FIG. 3A is obtained.

In the embodiment of the above construction, when the armrest body 4, located in the stored position, is forcibly pivotally moved slightly in the clockwise direction, merely the spring pin 12 slides over the lock-canceling cam 7b while the lock-canceled condition (in which the free-side hook 5b of the lock spring 5 abuts against the cancellation block 8) is maintained, and therefore an undue force will not act on the lock spring 5, the cam member 7 and so on, and therefore will not deform these lock mechanism parts.

In the operation for adjusting the angle of the above armrest apparatus, the cancellation block 8 is always urged by the lock spring 5, and abuts against it, and when the cancellation block 8 is abruptly brought into and out of abutting engagement with the lock-canceling cam portion 7b and the re-lock cam portion 7c, an accidental movement of the cancellation block and the production of an abnormal sound due to such accidental movement are liable to occur. In order to prevent these, it is preferred that the return spring 11, a wave spring, a grease of high viscosity, should be provided between the pivot shaft 10 and the cancellation block 8 as described above, thereby applying a frictional resistance.

As described above in detail, in the present invention, the following excellent advantages, which have not been obtained by the conventional constructions, are achieved.

The first effect of the present invention is that even when the armrest, located in the stored position, is forcibly pivotally moved slightly in the clockwise direction, the armrest is kept in the same posture (in which the lock spring abuts against the cancellation block) thanks to the provision of the lock-canceling cam portion, and an undue force will not act on the lock spring, the cam member and so on, and therefore the deformation of these lock mechanism parts as encountered in the conventional construction, will not occur.

The second effect of the present invention is that by suitably selecting the angle of mounting of the cam member relative to the seat frame about its axis, the peripheral length of the lock-canceling cam portion, and the distance between the lock-canceling cam portion and the re-lock cam portion, the operating position of the armrest and the range of its operation can be freely set. Namely, the increased degree of freedom of the design is obtained.

The third effect of the present invention is that the lock mechanism parts, including the lock spring, the cam member and the cancellation block, are simpler in configuration than those of the conventional construction, and therefore the precision of the parts is enhanced, and the production and the assemblage can be carried out easily, so that the cost can be reduced.

What is claimed is:

1. An armrest apparatus comprises:
   a fixed shaft fixed to a seat frame;
   a rotation plate integrally connected to an armrest body and having a tubular portion into which the fixed shaft is inserted, so that the tubular portion is rotatably supported on the fixed shaft;
   a lock spring wound tightly on outer peripheral surfaces of a part of the fixed shaft and the tubular portion of the rotation plate in a free condition, one end of the lock spring being formed into a fixing-side hook retained by the rotation plate, while the other end thereof being formed into a free-side hook;
   a cancellation block rotatably mounted on a pivot shaft, the pivot shaft being fixedly mounted on the rotation plate in parallel to the fixed shaft, and is disposed adjacent to the free-side hook; and
   a cam unit mounted on a distal end of the fixed shaft and including a lock-canceling cam portion and a re-lock cam portion,
   wherein while the armrest body being pivotally moved in a storing direction, the free-side hook abuts against the lock-canceling cam portion through the cancellation block, and the lock-canceling cam portion expands the lock spring in an unwinding direction to enlarge its diameter to cancel a locked condition of the armrest body,
   the re-lock cam portion is spaced from the lock-canceling cam portion in a direction of rotation of the cam member, while the armrest body being pivotally moved in an opening direction, the free-side hook abuts against the re-lock cam portion through the cancellation block, and the re-lock cam portion causes the lock spring to spring back in a diameter-reducing direction to lock the armrest body, and when the armrest is stored, the armrest further rotates in a direction which is opposite to the opening direction, the canceling block and the free side hook of the lock spring move internally along with the lock-canceling cam portion.

2. An armrest apparatus according to claim 1, further comprising:
   a spring pin mounted on the cancellation block,
   wherein while the armrest body is pivotally moved in the storing direction, the spring pin abuts against the lock-canceling cam portion to push up the cancellation block, and the cancellation block has a flat portion for abutting engagement with the lock-canceling cam portion to hold the cancellation block in the pushed-up position.

3. An armrest apparatus according to claim 1, wherein the angle of mounting of the cam member relative to the seat frame about its axis, a peripheral length of the lock-canceling cam portion, and the distance between the lock-canceling portion and the re-lock cam portion are determined in accordance with the operating position of the armrest and the range of operation thereof.

4. An armrest apparatus according to claim 1, wherein the rotation plate has a stamped-out projected portion which limits the range of rotation of the cancellation block.

5. An armrest apparatus according claim 1, wherein a return spring is fitted on the pivot shaft, is retained at one end thereof by the rotation plate, and at the other end thereof by the cancellation block, and
   the cancellation block is urged by the return spring in a direction toward or away from the free-side hook.

6. An armrest apparatus according to claim 1, wherein a frictional resistance member is provided between the pivot shaft and the cancellation block.

7. An armrest apparatus as set forth in claim 1, wherein the canceling block abuts with an outermost peripheral of the lock-canceling cam portion.

8. An armrest apparatus as set forth in claim 1, wherein the cam portion further has a reference portion, and the lock-canceling cam portion and the re-lock cam portion protrude from the reference portion in a radial direction, and when the canceling block goes up a step formed between the reference portion and the lock-canceling cam portion, the canceling block presses the free-side hook upwardly so that the spring is enlarged in diameter.

9. An armrest apparatus as set forth in claim 1, wherein the free-side hook extends in a radial direction of the spring.

10. An armrest apparatus as set forth in claim 1, wherein the canceling block has a flat portion which abuts with the free-side hook and protruded portion which abuts with the lock-canceling cam portion.

* * * * *